United States Patent
Wang et al.

(10) Patent No.: US 10,431,983 B2
(45) Date of Patent: Oct. 1, 2019

(54) THREE PHASE INVERTER DC-LINK VOLTAGE CONTROL METHOD FOR REACTIVE POWER OVERLOAD TRANSIENT PROCESS

(71) Applicant: S & C Electric Company, Chicago, IL (US)

(72) Inventors: Zitao Wang, Greenfield, WI (US);
Christine McNeil, West Allis, WI (US);
James Fisher, New Berlin, WI (US)

(73) Assignee: S & C Electric Company, Chicago, IL (US)

( * ) Notice: Subject to any disclaimer, the term of this patent is extended or adjusted under 35 U.S.C. 154(b) by 0 days.

(21) Appl. No.: 16/164,361

(22) Filed: Oct. 18, 2018

(65) Prior Publication Data

US 2019/0237972 A1    Aug. 1, 2019

Related U.S. Application Data (60) Provisional application No. 62/622,978, filed on Jan. 29, 2018.

(51) Int. Cl.

| | | |
|---|---|---|
| *H02M 7/5395* | (2006.01) | |
| *H02J 3/18* | (2006.01) | |
| *H02M 1/42* | (2007.01) | |
| *H02M 1/34* | (2007.01) | |
| *H02M 7/537* | (2006.01) | |

(52) U.S. Cl.
CPC ............ *H02J 3/1828* (2013.01); *H02M 1/34* (2013.01); *H02M 1/42* (2013.01); *H02M 7/5395* (2013.01); *H02M 7/537* (2013.01)

(58) Field of Classification Search
CPC ............ H02M 5/40; H02M 5/42; H02M 5/44;
H02M 5/443; H02M 5/45; H02M 5/4505;
H02M 5/451; H02M 5/452; H02M 5/458;
H02M 5/4585; H02M 7/42; H02M 7/48;
H02M 7/487; H02M 7/501; H02M 7/4826; H02M 7/497; H02M 7/49; H02M 7/4807; H02M 7/537; H02M 7/5387;
H02M 7/53; H02M 7/533; H02M 2007/4803; H02M 2007/4822
See application file for complete search history.

(56) References Cited

U.S. PATENT DOCUMENTS 5,717,305 A * 2/1998 Seibel ...................... H02P 1/26
318/432

* cited by examiner

*Primary Examiner* — Nguyen Tran
*Assistant Examiner* — Bryan R Perez (57) ABSTRACT

A system and method for controlling a grid-connected reactive power compensation inverter. The system uses a combination of feedforward and feedback controls to compute a reference voltage signal based on sensor-measured voltages and currents, where the reference voltage signal is used to control the inverter switches. The disclosed method modifies a cross-couple feedforward signal used in the reference voltage calculations, where the modified cross-couple signal includes a combination of both reference and actual currents, and the modified control scheme reduces the DC-link voltage overshoot experienced during a capacitive overload event while still providing the required reactive power and maintaining grid system stability.

17 Claims, 5 Drawing Sheets

THREE PHASE INVERTER DC-LINK VOLTAGE CONTROL METHOD FOR REACTIVE POWER OVERLOAD TRANSIENT PROCESS

CROSS-REFERENCE TO RELATED APPLICATION

This application claims the benefit of priority from the U.S. Provisional Application No. 62/622,978, filed on Jan. 28, 2018, the disclosure of which is hereby expressly incorporated herein by reference for all purposes.

BACKGROUND

Field

The present disclosure relates generally to a control scheme for a grid-connected three phase inverter which reduces DC-link voltage overshoot. More particularly, it relates to a control method and system for a grid-connected reactive power compensation inverter which modifies a cross-couple feedforward signal used in voltage command calculations. The modified cross-couple signal includes a combination of both reference and actual currents. The modified control scheme reduces the DC-link voltage overshoot experienced during a capacitive overload event while still providing the required reactive power and maintaining system stability.

Discussion of the Related Art

An electrical power transmission/distribution network, often referred to as an electrical grid, typically includes a number of power generation plants each including a number of power generator units, such as gas turbine engines, nuclear reactors, coal-fired generators, hydro-electric dams, etc. The grid may also include wind and/or solar energy generation farms. Not only are there many different types of energy generators on the grid, but there are also many different types of loads, and the generators and loads are distributed over large geographic areas. In light of the wide distribution of generation and variability of loads, and in light of stricter regulations concerning grid stability, grid power management has become increasingly important.

Grid power management includes both management of active (real) power to match customer load, and management of reactive power. Reactive power requirements vary over time, and also vary by location on the grid—as customers with large reactive loads (such as induction motors) can significantly affect reactive power requirements in a particular portion of the grid. Reactive power compensation inverters have been developed which are connected to the grid at various locations as needed—such as at substations, at wind or solar generation farms, or at large industrial customer sites—and provide reactive power of the phase and amplitude needed. These grid-connected compensation inverters serve a valuable function in maintaining grid stability, and also assist industrial customers with large inductive loads in maintaining an acceptable power factor.

In addition to normal operations where they provide the required reactive power, grid-connected compensation inverters of the type discussed above must be able to react and respond to grid disturbances which may suddenly create a need for a large increase in reactive power. When the reactive power requirement rises suddenly, inverter controls respond rapidly to meet the requirement. However, during such a transient event, voltage levels within the inverter—particularly the DC-link voltage—may increase to a level where damage could be done to inverter components such as the high-power switches. Inverter controllers typically allow some degree of overcapacity operation—such as a factor of 2.5× the normal rated reactive power, but only for a duration of 1-2 seconds—after which time, reactive power output must be reduced in order to prevent inverter damage. If the DC-link voltage spikes too high during a transient overcapacity event, an inverter safety circuit will trip, taking the inverter off-line and creating a large deficit in reactive power when it is needed most by the grid.

There is a need for more advanced inverter control schemes which enable the inverter to handle larger reactive power overcapacity events, for longer amounts of time, without risking damage to the inverter. Such an improvement in inverter controls would allow the inverter to provide even greater benefit in maintaining grid stability through reactive power management—especially during transient overcapacity events.

SUMMARY

The present disclosure describes a system and method for controlling a grid-connected reactive power compensation inverter. The system uses a combination of feedforward and feedback controls to compute a reference voltage signal based on sensor-measured voltages and currents, where the reference voltage signal is used to control the inverter switches. The disclosed method modifies a cross-couple feedforward signal used in the reference voltage calculations, where the modified cross-couple signal includes a combination of both reference and actual currents, and the modified control scheme reduces the DC-link voltage overshoot experienced during a capacitive overload event while still providing the required reactive power and maintaining grid system stability.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a three phase inverter DC-link voltage control method for reactive power transient overload is merely exemplary in nature, and is in no way intended to limit the disclosure or its applications or uses.

Figure 1:
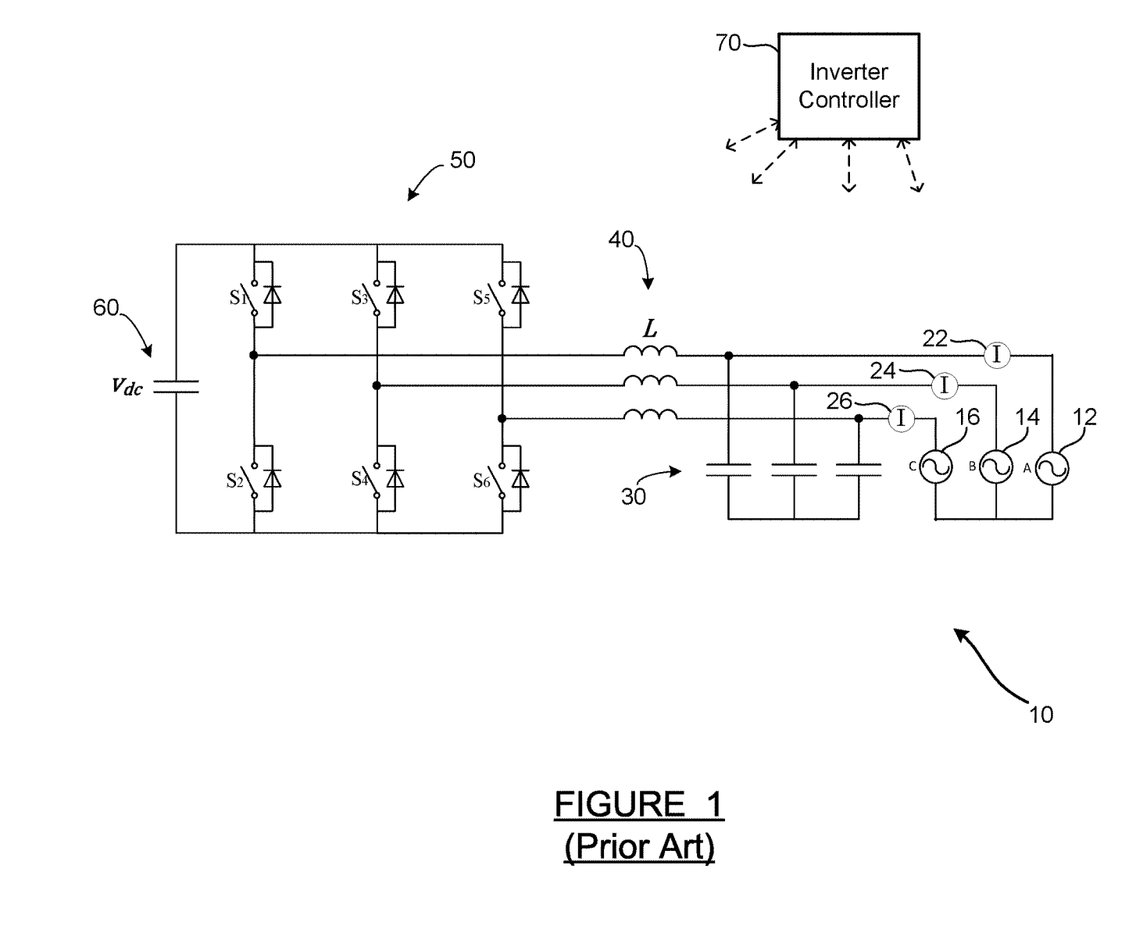
FIG. 1 is a schematic diagram of a grid-connected reactive power compensation inverter of a type known in the art.

FIG. 1 is a schematic diagram of a grid-connected reactive power compensation inverter 10 of a type known in the art. The inverter 10 is not a power generator or powerplant, and does not provide real power to the grid. Rather, the inverter 10 is designed to use a capacitor bank and an array of high-speed, high-power switches to transform grid power into reactive power to compensate for local conditions on the grid—that is, to compensate for situations where grid current leads or lags grid voltage by a significant phase angle. As is known in the art, it is desirable to maintain the lead/lag phase angle of grid voltage/current within a certain band, and this is what the reactive power compensation inverter 10 is designed to do.

The inverter 10 is a three phase device which is coupled to all three phase lines (ABC) of the grid. For the purposes of the discussion in this disclosure, the grid is an alternating current (AC) network, and the nominal operating frequency is 60 Hz unless otherwise noted. Grids in some parts of the world operate at other frequencies, such as 50 Hz, and the control principles discussed herein are applicable to these as well. Grid voltage for all three phases is measured by voltage sensors 12, 14 and 16. The voltage sensors measure voltage amplitude and phase angle, which are used in the control calculations discussed below. Current flowing between the grid and the inverter 10 is measured for all three phases by current sensors 22, 24 and 26.

The inverter 10 includes filters for conditioning the voltage and current delivered to the grid. A capacitive filter section 30 and an inductive filter section 40 are shown, where the filter sections 30 and 40 perform functions such as removing higher-order harmonics of the 60 Hz AC frequency from the voltage and current delivered to the grid.

A switch section 50 includes six high-power switches ($S_1$-$S_6$), each with a free-wheeling diode in parallel, as would be understood by one skilled in the art. The switches in the switch section 50 are modulated (switched open and closed rapidly according to a computed modulation scheme) in order to provide the desired reactive power to the grid. In one embodiment, the switches are Insulated Gate Bipolar Transistors (IGBTs), which have fast switching and high current carrying capability. Other types of switches may also be used in the switch section 50.

A DC-link capacitor bank 60 provides energy storage capacity whereby the inverter 10 can absorb power from the grid and return it to the grid at the required reactive amplitude and phase. A voltage $v_{dc}$ across the DC-link capacitor bank 60 is measured by a voltage sensor and used in the calculations discussed below.

An inverter controller 70 is in communication with the voltage sensors 12/14/16, the current sensors 22/24/26, the voltage sensor at the DC-link capacitor bank 60, and the switches $S_1$-$S_6$ in the switch section 50. The controller 70 is also in communication with a master controller (not shown) which determines an amount of reactive power needed by the grid at the location of the inverter 10, and provides a signal indicative of this reactive power requirement. This is all discussed further below.

Figure 2:
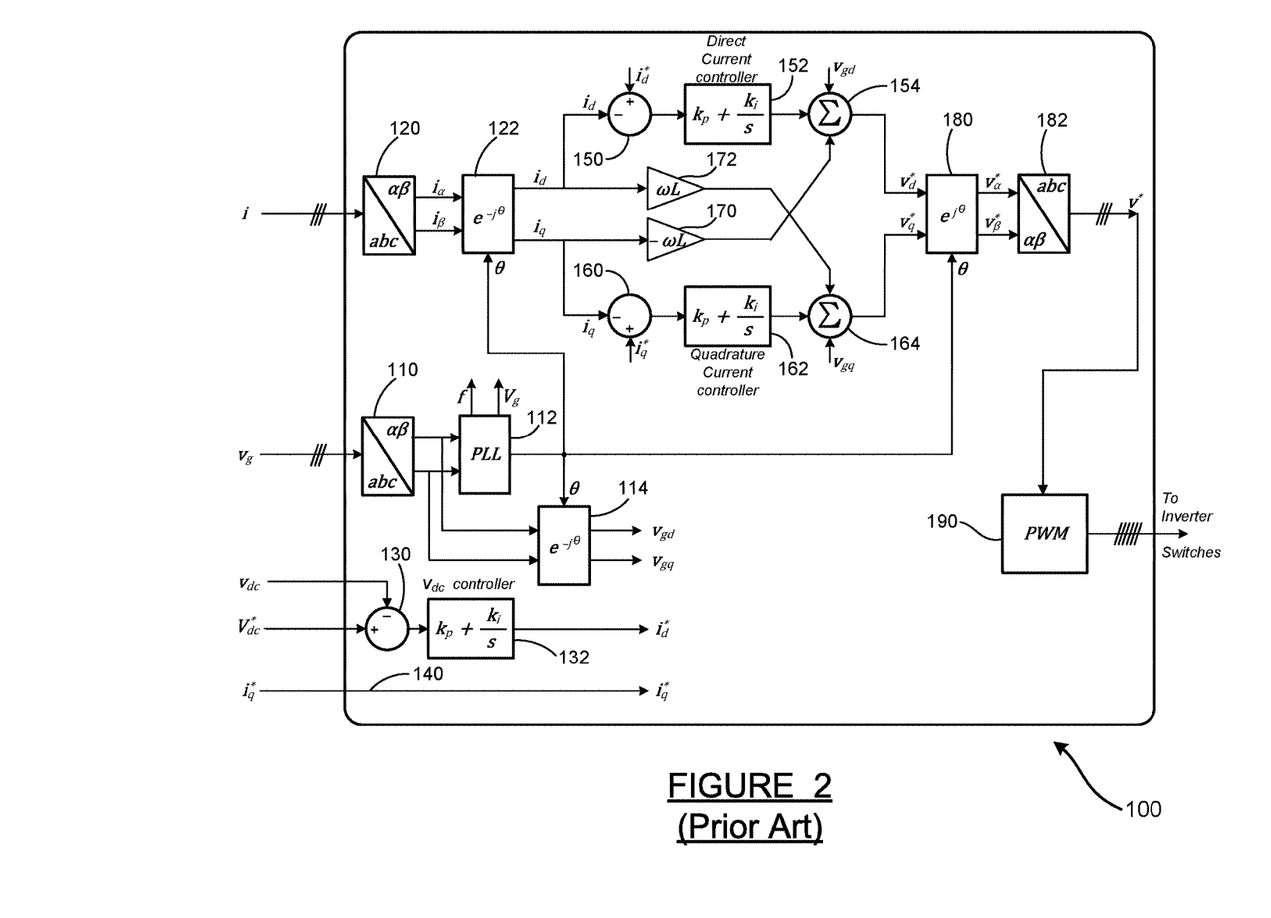
FIG. 2 is a block diagram of a controller using a known control scheme for controlling the inverter of FIG. 1.

FIG. 2 is a block diagram of a controller 100 employing a known control scheme for controlling the inverter of FIG. 1. The controller 100 is a particular embodiment of the controller 70 of FIG. 1, communicating with and controlling the grid-connected inverter 10.

The controller 100 receives grid voltage signals $v_g$ from the grid voltage sensors 12/14/16. The grid voltage signals $v_g$ include both amplitude and phase, for all three phases of the grid. The grid voltage signals $v_g$ are input to a transformation block 110 which transforms the three phase signals of lines abc to a two phase fixed reference frame ($\alpha\beta$), as is understood in the art. The $\alpha\beta$ voltage signals are provided to a Phase Locked Loop (PLL) module 112, which computes a nominal grid frequency f and a nominal grid voltage $v_g$, used later. The PLL module 112 also determines the instantaneous phase angle $\theta$ of the grid voltage. The phase angle $\theta$ is used in multiple places in the controller 100.

A transformation block 114 transforms grid voltage from the fixed $\alpha\beta$ reference frame to the rotating direct-quadrature (dq) reference frame, using the $\alpha\beta$ signals and the phase angle $\theta$. Performing AC electrical system control calculations in the dq reference frame, also known as the synchronous reference frame, is well understood and widely accepted in the art, as use of the dq reference frame simplifies many calculations and provides more intuitive understanding of voltage/current and active/reactive phenomenon. The transformation block 114 outputs grid voltage as direct and quadrature components, $v_{gd}$ and $v_{gq}$, respectively.

The controller 100 receives current signals i from the current sensors 22/24/26. The current signals i include both amplitude and phase, for all three phases. The current signals i are received by a transformation block 120 which transforms the three phase signals of lines abc to the two phase fixed reference frame ($\alpha\beta$), as described above for the grid voltage. The $\alpha\beta$ current signals are provided to a transformation block 122 which transforms current from the fixed $\alpha\beta$ reference frame to the rotating dq reference frame, using the $\alpha\beta$ signals and the phase angle $\theta$. The transformation block 122 outputs current as direct and quadrature components, $i_d$ and $i_q$, respectively.

The actual instantaneous DC-link voltage $v_{dc}$, along with a DC-link reference (target) voltage $V_{dc}^*$, are provided to a summing junction 130, where a difference or error between the DC-link reference voltage $V_{dc}^*$ and the DC-link voltage $v_{dc}$ is computed. The DC-link voltage $v_{dc}$ is provided by the voltage sensor at the DC-link capacitor bank 60 shown in FIG. 1. The DC-link reference voltage $V_{dc}^*$ is determined internally within the inverter controller 100, and is set to a value of 800 volts (V) for normal inverter operation. However, during a reactive power overload event, a $V_{dc}^*$ value of 800 V is not high enough to provide the needed reactive power, and the controller 100 will increase the value of the DC-link reference voltage $V_{dc}^*$ as discussed below.

The output of the summing junction 130 is provided to a $V_{dc}$ controller 132. The $V_{dc}$ controller 132 is a proportional-integral (PI) controller, where an output is computed based both on an error (difference) value and on an integral of the error value, as is well understood in the art. The output of the $V_{dc}$ controller 132 is a direct reference current $i_d^*$. Because the inverter 10 is not a generator providing real power to the grid, the direct component of current is generally small, either positive or negative. In simple terms, if the actual DC-link voltage $v_{dc}$ is lower than the DC-link reference voltage $V_{dc}^*$, then the direct reference current $i_d^*$ will call for current flow into the DC-link capacitor bank 60 to raise the actual DC-link voltage $v_{dc}$.

A quadrature reference current $i_q^*$ is provided on line 140 from the master controller discussed previously. The master controller determines in real time how much reactive power needs to be provided to the grid at the particular location of the inverter 10, and establishes the value of the quadrature reference current $i_q^*$ accordingly. The values of the direct reference current $i_d^*$, the quadrature reference current $i_q^*$, and the direct and quadrature grid voltage components, $v_{gd}$ and $v_{gq}$, are used in the main control branch in the controller 100, discussed below. Lines and arrows linking all of these values from their source to their destination are omitted from FIG. 2 for clarity.

Returning to the main control branch at the top of FIG. 2, the direct and quadrature components of current, $i_d$ and $i_q$, are output from the transformation block 122 as described above. A summing junction 150 receives and computes a difference between the direct reference current $i_d^*$ and the direct component of current $i_d$. The difference or error between the direct reference current $i_d^*$ and the direct component of current $i_d$ is provided to a direct current controller 152, which is a PI controller which operates in the manner discussed previously for the $V_{dc}$ controller 132. The direct current controller 152 provides its output to a summing junction 154, which also receives two other inputs—the grid voltage direct component $v_{gd}$ from the transformation block 114, and a cross-couple feedforward term which will be discussed below.

Quadrature current calculations are performed in a like manner to the direct current calculations discussed above. A summing junction 160 receives and computes a difference between the quadrature reference current $i_q^*$ and the quadrature component of current $i_q$. The difference or error between these two values is provided to a quadrature current controller 162, which is also a PI controller operating in the manner discussed previously. The quadrature current controller 162 provides its output to a summing junction 164, which also receives two other inputs—the grid voltage quadrature component $v_{gq}$ from the transformation block 114, and a cross-couple feedforward term discussed below.

The cross-couple feedforward terms are computed as follows. The quadrature component of current $i_q$ is provided to a multiplier 170 where it is multiplied by –ω (ω is equal to 2πf, where f is provided by the PLL module 112) and L (the inductance of the inductive filter section 40, which is known). This quadrature –$i_q$ωL term is provided ("cross coupled") to the direct voltage summing junction 154, along with the output of the direct current controller 152 and the grid voltage direct component $v_{gd}$ from the transformation block 114. The output of the direct voltage summing junction 154 is a direct reference voltage $v_d^*$.

Analogously, the direct component of current $i_d$ is provided to a multiplier 172 where it is multiplied by ωL. This direct $i_d$ωL term is provided to the quadrature voltage summing junction 164, along with the output of the quadrature current controller 162 and the grid voltage quadrature component $v_{gq}$ from the transformation block 114. The output of the quadrature voltage summing junction 164 is a quadrature reference voltage $v_q^*$.

The direct and quadrature reference voltages $v_d^*$ and are provided to a transformation block 180 where they are transformed back to the two phase fixed reference frame (αβ), in the inverse of the operation discussed previously. At a transformation block 182, the al voltage signals are transformed back to the three phase signals of lines abc. The output of the transformation block 182 is a reference voltage v*. The reference voltage v* is used by a PWM module 190, a digital signal processor (DSP) which uses some form of pulse-width modulation calculation (such as Sinusoidal PWM, Space Vector PWM, Third Harmonic Injection PWM, etc.) to convert the three phase reference voltage waveforms v* into switch commands for the switches $S_1$-$S_6$ in the switch section 50 of the inverter 10. The switch commands from the PWM module 190 are provided to a switch gate drive board which turns the switches $S_1$-$S_6$ on/off according to the PWM computed to match the three phase reference voltage waveforms v*.

The inverter 10 has a rating for the amount of steady state reactive power it can provide, where this rating may be in a range of 5-10 MVAR (mega volt-amps reactive) for a particular commercially-available inverter. As long as the amount of reactive power being requested by the grid (the master controller) is at or below the inverter's rating, the controller 100, including the logic discussed above, controls the switch section 50 such that the inverter 10 maintains stable operation and provides the required reactive power. However, if the reactive power requirement climbs significantly above the rated value of the inverter 10, such as to a factor of 2.0 or above, the inverter 10 may not be able to meet the requirement.

Very large reactive power requirement surges, such as to 2× or 3× the inverter rating, are usually due to some disturbance on the grid, and are usually transient and short term in duration. Nevertheless, even a second or less of overcapacity operation could damage components of the inverter 10, and therefore, the controller 100 is programmed to prevent reactive power output above a certain factor of the inverter rating. In the commercial inverter example mentioned above, that factor is 3.0, based on the need to keep the DC-link voltage (felt by the switches) from exceeding 900 V.

As described earlier, when the reactive power requirement is at or below the rated value of the inverter 10, the controller 100 maintains the DC-link reference voltage $V_{dc}^*$ at 800 V. However, during a reactive power overload event, a $V_{dc}^*$ value of 800 V is not high enough to provide the needed reactive power, and the controller 100 will increase the value of the DC-link reference voltage $V_{dc}^*$.

The DC-link voltage needed to produce a certain reactive (quadrature) current can be determined as follows:

$$V_{dc} > \sqrt{2} \times V_{ac}(v_{grid} - \omega L i_q) \qquad (1)$$

Where $V_{ac}$ is the normal grid line-to-line voltage, and $v_{grid}$ and $i_q$ are unit values.

Using Equation (1), it can be determined that, even for an overcapacity reactive power event at –3.0 times the rated value of the inverter 10, the steady state value of the DC-link voltage only needs to be above 805 volts.

$$V_{dc} > \sqrt{2} \times 480(1.0 - 0.062(-3.0)) = 805 \text{ V} \qquad (2)$$

Where the grid is at its nominal voltage of 480 V, and 0.062 is the value of ωL for the example inverter at 60 Hz. In such an event, the controller 100 will increase the DC-link reference voltage $V_{dc}^*$ to a value higher than 805 V, such as about 850 V, to ensure sufficient DC-link voltage is available to meet the reactive power requirement.

Figure 3:
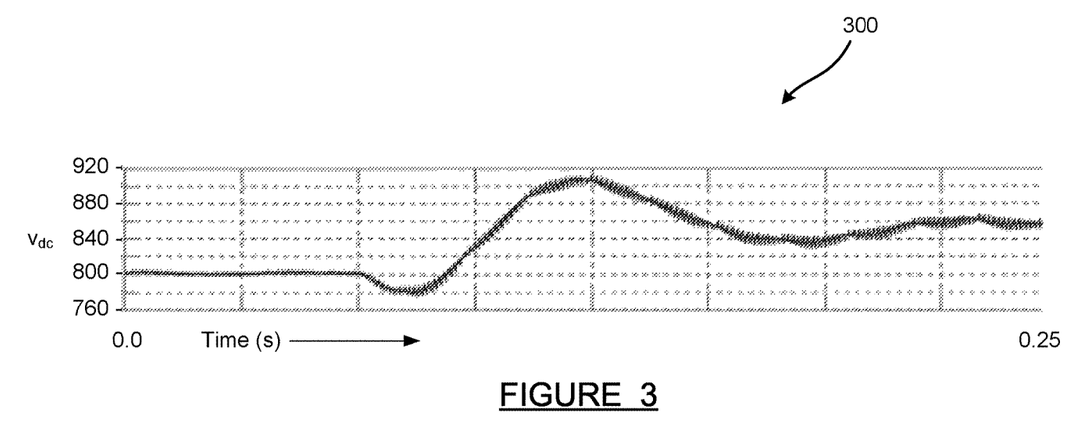
FIG. 3 is a graph of DC-link voltage in the inverter during an overcapacity transient event using the known control scheme of FIG. 2.

However, if the reactive power requirement increase is a surge event with a step-function nature, significant oscillatory transients will be developed in the controller 100, including a DC-link voltage overshoot causing the value of $v_{dc}$ to reach or exceed 900 V. This is shown in FIG. 3, which is a graph 300 of DC-link voltage in the inverter 10 during an overcapacity transient event using the known control scheme of FIG. 2. In the graph of FIG. 3, the surge in the reactive power requirement begins at a time of approximately 0.06 sec. The DC-link voltage first drops because of the large increase in outgoing quadrature current to the grid to meet the reactive power demand. As a result of the DC-link voltage dropping, the direct current is increased by the controller 100, causing the DC-link voltage to rebound (increase). As can be seen in FIG. 3, the DC-link voltage significantly overshoots its steady state value, peaking at over 900 V at a time of about 0.12 sec. The DC-link voltage oscillations then settle out at a lower value.

In the example inverter, a DC-link voltage over 900 V will cause a safety circuit to trip open in order to prevent damage to the switches. To avoid such an undesirable event, it is necessary to prevent the DC-link voltage from reaching or exceeding 900 V. The challenge then becomes how to modify the control scheme so that the inverter 10 can handle an overcapacity reactive power event at −3.0 times the rated value without experiencing such a large DC-link voltage overshoot.

From the existing control scheme shown in the block diagram of FIG. 2, it is recalled that the cross-couple feedforward terms (the "iωL" terms) include the direct and quadrature components of actual current, $i_d$ and $i_q$, respectively. Because $i_d$ rises rapidly (in response to the DC-link voltage deficit) during an $i_q$ surge event, there is a rapid increase in both direct and quadrature components of actual current in the cross-couple feedforward terms. This rapid increase in magnitude of the iωL cross-couple terms results in the DC-link voltage overshoot described above.

The solution disclosed herein is to modify the cross-couple feedforward terms to include both actual and reference values of the direct and quadrature current components. The actual and reference values of current are assigned coefficients which have a sum of 1 (such as −1 and 2, respectively), so as to ensure that the system converges to the correct voltage level. However, by including the reference current values in the cross-couple terms, the rapid increase in actual current values is negated and the DC-link voltage overshoot is virtually eliminated. This modified control scheme is described below.

Figure 4:
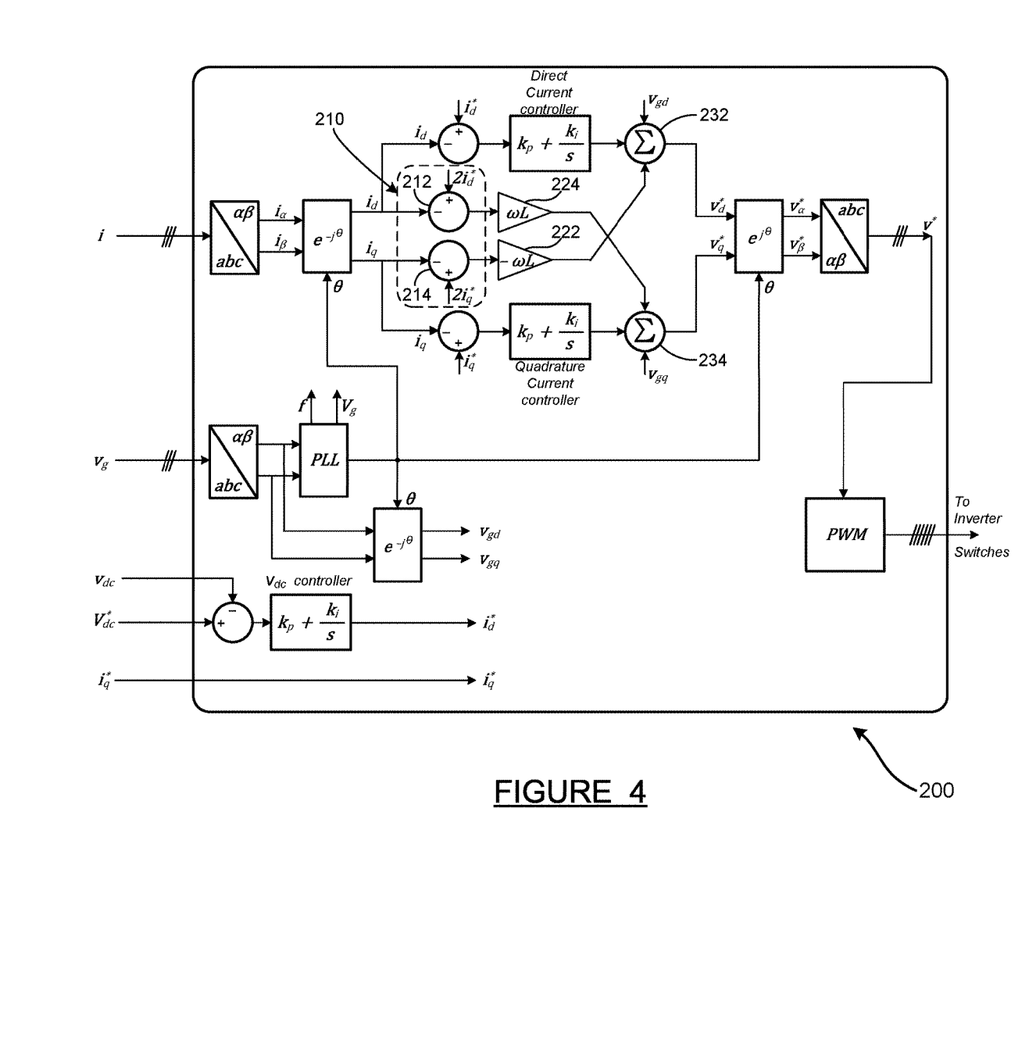
FIG. 4 is a block diagram of a controller using a new control scheme for controlling the inverter to reduce DC-link voltage overshoot during an overcapacity transient event, according to an embodiment of the present disclosure.

FIG. 4 is a block diagram of a controller 200 using a new control scheme for controlling the inverter to reduce DC-link voltage overshoot during an overcapacity transient event, according to an embodiment of the present disclosure. As discussed in detail below, the new control scheme of the controller 200 addresses the problems discussed above, and effectively reduces the DC-link voltage overshoot, thus enabling the inverter 10 to operate at a higher reactive power overload condition without experiencing damaging levels of DC-link voltage.

The controller 200, which is a new embodiment of the controller 70 of FIG. 1, includes many of the same components as the controller 100 of FIG. 2. These components, which are unchanged in operation from that discussed above, are unnumbered in FIG. 4 for the sake of clarity. The changes to the controller 200 relative to the controller 100 are in the main control branch near the top of the figure.

As discussed previously, the current from the sensors 22/24/26 of the inverter 10 provide three phase line currents to the controller 200, where the currents are then transformed to dq components. The current components, $i_d$ and $i_q$, are compared to their reference values and the error is processed by the two PI current controllers, the same as in the controller 100. Now, however, the cross-couple feedforward terms are modified. In particular, new control structure is included in box 210, where summing junctions 212 and 214 have been added. At the summing junction 212, the direct component of current $i_d$ is input with a coefficient of −1, and the direct reference current $i_d^*$ is input with a coefficient of 2. The output of the summing junction 212 is provided to multiplier 224, where it is multiplied by a factor of ωL as before, and provided to summing junction 234.

Similarly, at the summing junction 214, the quadrature component of current $i_q$ is input with a coefficient of −1, and the quadrature reference current $i_q^*$ is input with a coefficient of 2. The output of the summing junction 214 is provided to multiplier 222, where it is multiplied by a factor of −ωL as before, and provided to summing junction 232.

As described above, the inclusion of the reference components of current in the iωL cross-couple terms significantly changes the dynamic response of the controller 200 relative to the controller 100. In particular, this modification virtually eliminates the DC-link voltage overshoot problem of the prior art controller.

The coefficients assigned to the reference and actual current components need not be 2 and −1, respectively. The coefficients can be any combination (such as 1.5 and −0.5) which add up to 1 and which provide the desired dynamic system response. Furthermore, the coefficients assigned to the direct and quadrature current components need not be the same; for example, the direct current components (reference and actual) could be set to 2 and −1, respectively, while the quadrature current components (reference and actual) could be set to 0 and 1, respectively. However, coefficient values of 2 (reference) and −1 (actual)—for both direct and quadrature—represent a preferred embodiment which has demonstrated good performance in system simulations and tests.

Following is a discussion of the theory behind the new control scheme embodied in the controller 200 of FIG. 4. As discussed above, the cross-couple feedforward term −ωL$i_q$(t) of the previously existing control method is modified to become −2ωL$i_q^*$(t)+ωL$i_q$(t) in the new control method, and the term ωL$i_d$(t) of the existing control method is modified in the new control method to become 2ωL$i_d^*$(t)−ωL$i_d$(t).

Now, in the existing control method, for a given output reference voltage v*, the relationship between the direct and quadrature reference voltages $v_d^*$ and $v_q^*$ (expressed as the three terms in the summing junctions 154 and 164) can be written as:

$$[v_q+\omega Li_d(t)+PI(i_q((t))]^2+[v_d-\omega Li_q(t)+PI(i_d(t))]^2=[v^*]^2 \quad (3)$$

Where PI( . . . ) represents the output of the PI controllers 152 and 162, and the other variables have all been defined above.

Similarly, for the new control method, the following relationship can be written:

$$[v_q+2\omega Li_d^*(t)-\omega Li_d(t)+PI(i_q(t))]^2+[v_d+2\omega Li_q^*(t)-\omega Li_q(t)+PI(i_d(t))]^2=[v^*]^2 \quad (4)$$

Through tests and simulations, it has been found that $i_q$(t) follows $i_q^*$(t) immediately, but $i_d$(t) cannot follow $i_d^*$(t) and instead has a large surge. Then, when −ωL$i_q^*$(t)≈−ωL$i_q$(t) at the same PI $i_d$(t)) (saturation peak value), $v_d$ and $i_q$ (t), from Equations (3) and (4):

$$|v_q-\omega Li_q(t)+PI(i_d(t))|_{Existing} \approx |v_d-2\omega Li_q^*(t)+\omega Li_q(t)+PI(i_d(t))|_{New} \quad (5)$$

and $$|v_q+\omega Li_d(t)+PI(i_q(t))|_{Existing} > |v_q+2\omega Li_d^*(t)-\omega Li_d(t)+PI(i_q(t))|_{New} \quad (6)$$

Furthermore, when $(v_q+\omega Li_d(t)+PI(i_q(t)))_{Existing}>0$ and $(v_q+2\omega Li_d^*(t)-\omega Li_d(t)+PI(i_q(t)))_{New}>0$ it follows from Equations (5)-(6) that:

$$|i_d(t)|_{Existing} > |2i_d(t)-i_d(t)|_{New} \quad (7)$$

at $i_d^*$(t)>0 and $i_d$(t)>0.

Equation (7) indicates that the magnitude of the direct current cross-couple feedforward term (for a given ωL) in the new method will be less than that of the existing method, which in turn suggests the DC-link voltage overshoot (which is related to the rapid increase in $i_d$ during the transient event) should be less with the new method than with the existing method. Simulations and tests confirm this, and also confirm simply that:

$$|i_d(t)|_{Existing} > |i_d(t)|_{New} \qquad (8)$$

That is, the direct component of actual current resulting from the new method has a smaller magnitude during the transient reactive power overload event than the direct component of actual current from the existing method. With lower magnitude (less overshoot) of $i_d$, less overshoot of the DC-link voltage follows in the new method.

Figure 5:
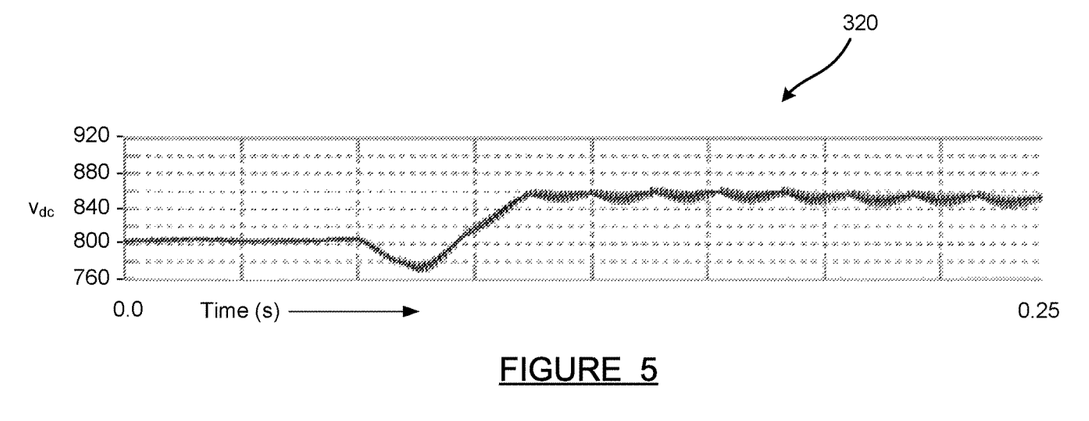
FIG. 5 is a graph of DC-link voltage in the inverter during an overcapacity transient event using the new control scheme of FIG. 4.

FIG. 5 is a graph 320 of DC-link voltage in the inverter 10 during a reactive power overcapacity transient event using the new control scheme of FIG. 4, with coefficient values of 2 (reference) and −1 (actual). As in the graph of FIG. 3, the surge in reactive power requirement begins at a time of approximately 0.06 sec. The drop in DC-link voltage, due to the large increase in quadrature current to the grid, is still evident in FIG. 5 using the new control scheme. However, instead of the DC-link voltage rebounding and significantly overshooting its steady state value, the DC-link voltage instead rebounds to and holds at the new steady state value, with virtually no overshoot. In both FIGS. 3 and 5, a small-amplitude oscillation in DC-link voltage at the line frequency of 60 Hz is apparent, but these oscillations are inconsequential as they are of such small amplitude.

The graph of FIG. 5, in comparison to FIG. 3, clearly shows the effectiveness of the new control method in reducing (virtually eliminating) DC-link voltage overshoot in the inverter 10 during a reactive power overcapacity transient event.

Figure 6:
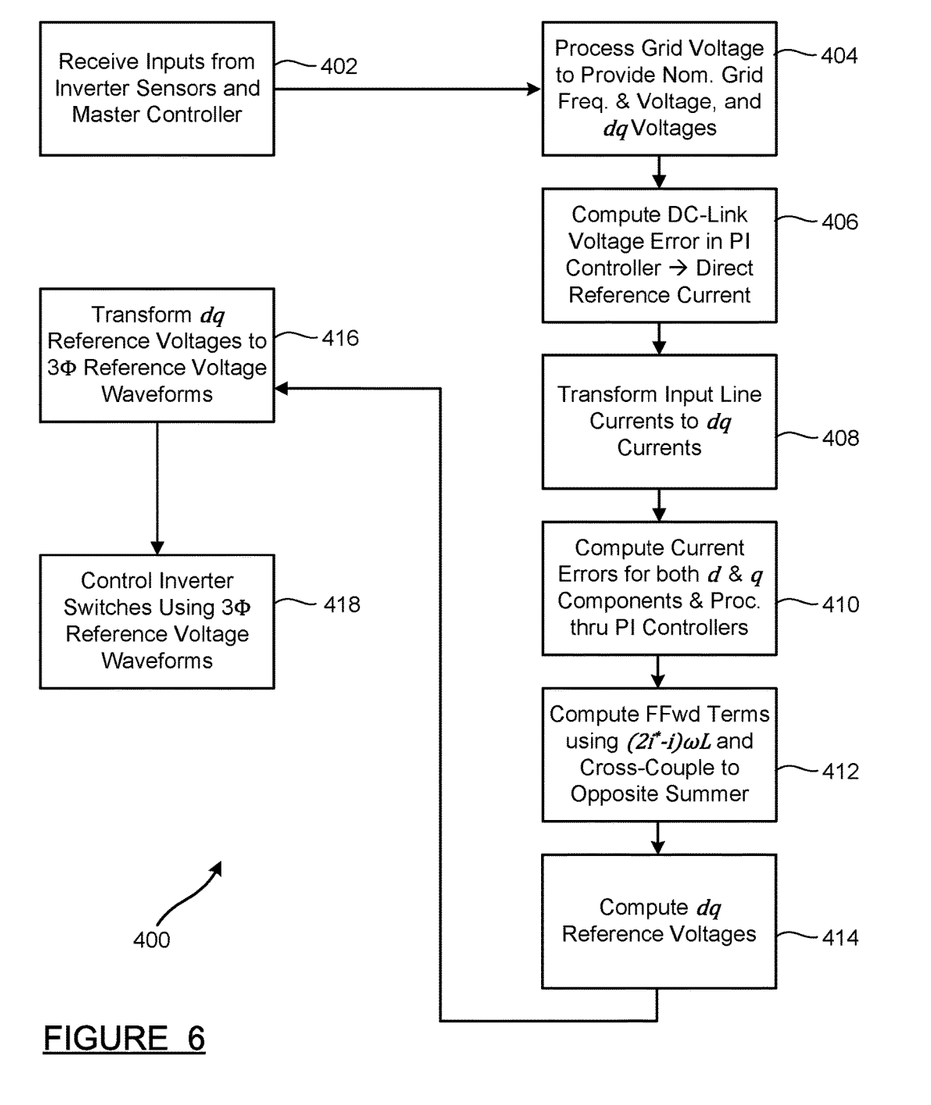
FIG. 6 is a flowchart diagram of a method for controlling the inverter according to the inventive embodiment shown in the controller block diagram of FIG. 4.

FIG. 6 is a flowchart diagram 400 of a method for controlling the inverter 10 according to the inventive embodiment shown in the block diagram of the controller 200 of FIG. 4. At box 402, the inverter controller 200 receives the inputs needed for the control calculations. As discussed above, the inputs include three phase grid voltage (amplitude and phase) from the voltage sensors 12/14/16, three phase grid-inverter current from the current sensors 22/24/26 and DC-link voltage from the voltage sensor at the DC-link capacitor bank 60. The inputs also include a quadrature current reference signal, indicative of the required amount of reactive power, from the master controller.

At box 404, the grid voltage input is processed through a phase locked loop (PLL) module to provide grid frequency, nominal grid voltage and the instantaneous phase angle θ, and also processed through transformation modules to transform the three phase line voltage signals to two phase rotating (synchronous) frame (dq) signals. At box 406, the DC-link voltage input is compared to a DC-link reference voltage value and the error is processed by a PI control block to provide a direct reference current $i_d^*$.

At box 408, the current input is processed through transformation modules to transform the three phase line current signals to two phase rotating (synchronous) frame (dq) signals. At box 410, the direct component of current is compared to the direct reference current and the error is processed through a PI controller. Also at the box 410, the quadrature component of current is compared to the quadrature reference current and the error is processed through a PI controller.

At box 412, cross-couple feedforward terms are computed as $(2i^*−i)\omega L$ for both direct and quadrature components (with quadrature being negative). In other words, the direct component of current is subtracted from two times the direct reference current, and this value is multiplied by the angular frequency ω and the filter inductance L, then summed with the quadrature grid voltage and the output of the quadrature current controller. Likewise, the quadrature component of current is subtracted from two times the quadrature reference current, and this value is multiplied by −ωL, then summed with the direct grid voltage and the output of the direct current controller. The outputs of the summing junctions are the direct and quadrature components of reference voltage. As noted earlier, the coefficients of reference and actual current need not necessarily be 2 and −1.

At box 414, the direct and quadrature components of reference voltage are computed at the respective summing junctions using the cross-couple feedforward terms, the output of the PI current controllers and the d and q grid voltage components.

At box 416, the direct and quadrature components of reference voltage are processed through transformation modules to transform the synchronous frame (dq) voltage signals into three phase reference voltage signals. At box 418, the inverter controller 200 controls the operation of the inverter switches in the switch section 50 using the three phase reference voltage waveforms v*. The v* signals are provided as input to a digital signal processor such as a PWM module which computes the on/off sequences for the switches $S_1$-$S_6$ based on the three phase reference voltage waveforms v*. This results in the inverter 10 providing the required reactive power while minimizing DC-link voltage overshoot in the inverter 10 during a reactive power overcapacity transient event. Of course, the inverter controller 200 performs these calculations continuously and in real time to control the operation of the inverter 10.

As will be well understood by those skilled in the art, the several and various steps and processes discussed herein to describe the disclosed methods may be referring to operations performed by a computer, a processor or other electronic calculating device that manipulate and/or transform data using electrical phenomenon. In particular, this refers to the control calculations and operations performed by the controllers 100 and 200. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The new inverter control scheme described above enables a grid-connected reactive power compensation inverter to deliver a large surge in reactive current to meet the demands of a grid transient event, thereby maintaining grid stability. At the same time, the new control scheme handles internal operations of the inverter much more effectively, dramatically reducing the DC-link voltage overshoot which could damage the inverter or cause it to trip off-line. In these ways, the new control scheme provides significant benefit to the inverter manufacturer and its customers, and to all consumers on the grid.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for controlling a grid-connected three phase reactive power compensation inverter to deliver a required amount of reactive power to a grid while limiting an internal DC-link voltage transient overshoot, said method comprising:

receiving, by an inverter controller, inputs including three phase grid voltage signals, a DC-link voltage signal, and three phase grid-inverter current signals from sensors, and a quadrature current reference signal from a master controller;

computing, using a processor in the inverter controller, three phase reference voltage signals based on the inputs, where the reference voltage signals are computed using real-time control calculations in a direct-quadrature reference frame including cross-couple feedforward terms wherein reference and actual components of direct current are combined and multiplied by an angular frequency and an inverter filter inductance and then cross-coupled to a quadrature voltage summer, and reference and actual components of quadrature current are combined and multiplied by (−1) and the angular frequency and the inverter filter inductance and then cross-coupled to a direct voltage summer; and controlling duty cycles of a plurality of inverter switches, using a pulse-width modulation (PWM) module in the inverter controller, based on the three phase reference voltage signals; wherein, computing three phase reference voltage signals includes:

processing the grid voltage signals to provide nominal grid voltage and frequency values and an instantaneous phase angle, and direct and quadrature voltage components;

computing a DC-link voltage adjustment in a proportional-integral (PI) controller based on the DC-link voltage signal and a DC-link reference voltage, and calculating a direct reference current based on the DC-link voltage adjustment;

transforming the grid-inverter current signals to provide direct and quadrature current components;

computing a direct current adjustment in a PI controller based on the direct reference current and the direct current component, and computing a quadrature current adjustment in a PI controller based on the quadrature reference current and the quadrature current component;

combining the direct current adjustment with the direct voltage component in the direct voltage summer, and combining the quadrature current adjustment with the quadrature voltage component in the quadrature voltage summer;

computing a direct feedforward term and cross-coupling it to the quadrature voltage summer, and computing a quadrature feedforward term and cross-coupling it to the direct voltage summer; and transforming outputs of the direct voltage summer and the quadrature voltage summer to the three phase reference voltage signals.

2. The method according to claim 1 wherein the reference and actual components of current are combined in a weighted sum using coefficients which add up to a value of 1.

3. The method according to claim 2 wherein the reference components of current have a positive coefficient and the actual components of current have a negative coefficient.

4. The method according to claim 2 wherein the reference and actual components of direct current are combined in a weighted sum using coefficients of 2 and −1, respectively, and the reference and actual components of quadrature current are combined in a weighted sum using coefficients of 2 and −1, respectively.

5. The method according to claim 1 wherein processing the grid voltage signals to provide nominal grid voltage and frequency values and an instantaneous phase angle includes using a phase locked loop routine.

6. The method according to claim 1 wherein the quadrature current reference signal from the master controller designates the required amount of reactive power by the grid, including reactive power requirements during grid disturbances which exceed a rated capacity of the inverter.

7. The method according to claim 1 wherein the plurality of inverter switches is six Insulated Gate Bipolar Transistor (IGBT) switches, where two of the IGBT switches are used for each line phase.

8. The method according to claim 1 wherein the PWM module in the inverter controller uses a Sinusoidal PWM, Space Vector PWM or Third Harmonic Injection PWM algorithm to compute the duty cycles of the inverter switches.

9. A method for limiting a DC-link voltage overshoot in a grid-connected three phase inverter during a reactive power overload event, said method comprising:

receiving, by an inverter controller, inputs including three phase grid voltage signals, a DC-link voltage signal, and three phase grid-inverter current signals from sensors, and a quadrature current reference signal from a master controller;

computing, using a processor in the inverter controller, three phase reference voltage signals based on the inputs, where the reference voltage signals are computed using real-time control calculations in a direct-quadrature reference frame including direct and quadrature cross-couple feedforward terms wherein a direct component of actual current is subtracted from two times a direct reference current to produce a difference which is multiplied by an angular frequency and an inverter filter inductance and then cross-coupled to a quadrature voltage summer, and a quadrature component of actual current is subtracted from two times a quadrature reference current to produce a difference which is multiplied by (−1) and the angular frequency and the inverter filter inductance and then cross-coupled to a direct voltage summer; and controlling duty cycles of a plurality of inverter switches, using a pulse-width modulation (PWM) module in the inverter controller, based on the three phase reference voltage signals; wherein, the direct voltage summer combines a direct component of grid voltage, an output of a direct current proportional-integral (PI) controller and the quadrature cross-couple feedforward term to produce a direct reference voltage, and the quadrature voltage summer combines a quadrature component of grid voltage, an output of a quadrature current proportional-integral (PI) controller and the direct cross-couple feedforward term to produce a quadrature reference voltage.

10. The method according to claim 9 wherein the direct and quadrature reference voltages are transformed to a two-phase fixed reference frame and then to the three phase reference voltage signals.

11. The method according to claim 9 wherein the PWM module in the inverter controller uses a Sinusoidal PWM, Space Vector PWM or Third Harmonic Injection PWM algorithm to compute the duty cycles of the inverter switches.

12. A controller for controlling a grid-connected three phase reactive power compensation inverter to deliver a required amount of reactive power to an electrical grid while limiting an internal DC-link voltage transient overshoot, said controller comprising:

means for receiving sensor inputs including three phase grid voltage signals, a DC-link voltage signal, three phase grid-inverter current signals, and a quadrature current reference signal;

a processor configured to compute three phase reference voltage signals based on the inputs, where the reference voltage signals are computed using real-time control calculations in a direct-quadrature reference frame including direct and quadrature cross-couple feedforward terms wherein reference and actual components of direct current are combined and multiplied by an angular frequency and an inverter filter inductance and then cross-coupled to a quadrature voltage summer, and reference and actual components of quadrature current are combined and multiplied by (−1) and the angular frequency and the inverter filter inductance and then cross-coupled to a direct voltage summer; and means for controlling duty cycles of a plurality of inverter switches based on the three phase reference voltage signals; wherein, the sensor inputs include the three phase grid voltage signals including phase and amplitude for all three phases of the grid from grid voltage sensors, the DC-link voltage signal indicating voltage across an inverter DC-link capacitor from a DC-link voltage sensor, the three phase grid-inverter current signals measuring current flowing between the inverter and the grid for each phase from current sensors, and the quadrature current reference signal indicating a desired value of reactive power to be delivered to the grid by the inverter from a master controller.

13. The controller according to claim 12 wherein the reference and actual components of current are combined in a weighted sum using coefficients which add up to a value of 1.

14. The controller according to claim 13 wherein the reference components of current have a positive coefficient and the actual components of current have a negative coefficient.

15. The controller according to claim 13 wherein the reference and actual components of direct current are combined in a weighted sum using coefficients of 2 and −1, respectively, and the reference and actual components of quadrature current are combined in a weighted sum using coefficients of 2 and −1, respectively.

16. The controller according to claim 12 wherein the direct voltage summer combines a direct component of grid voltage, an output of a direct current proportional-integral (PI) controller and the quadrature cross-couple feedforward term to produce a direct reference voltage, and the quadrature voltage summer combines a quadrature component of grid voltage, an output of a quadrature current proportional-integral (PI) controller and the direct cross-couple feedforward term to produce a quadrature reference voltage, and the direct and quadrature reference voltages are transformed to a two-phase fixed reference frame and then to the three phase reference voltage signals.

17. The controller according to claim 12 wherein the means for controlling duty cycles of the plurality of inverter switches is a PWM module in the controller which uses a Sinusoidal PWM, Space Vector PWM or Third Harmonic Injection PWM algorithm to compute the duty cycles of the inverter switches.

* * * * *